United States Patent [19]

Watanabe

[11] 4,367,033
[45] Jan. 4, 1983

[54] COMBINED READER-PRINTER
[75] Inventor: Yutaka Watanabe, Tokyo, Japan
[73] Assignee: Minolta Camera Kabushiki Kaisha, Osaka, Japan
[21] Appl. No.: 270,830
[22] Filed: Jun. 5, 1981
[30] Foreign Application Priority Data Jun. 30, 1980 [JP] Japan .............................. 55-91865[U]

[51] Int. Cl.³ .......................................... G03G 15/00
[52] U.S. Cl. ......................................... 355/5; 355/8; 355/11; 355/45; 355/66
[58] Field of Search ..................... 355/5, 8, 11, 49, 65, 355/66, 43, 44, 45, 60

[56] References Cited
U.S. PATENT DOCUMENTS 4,170,412 10/1979 Grace et al. ............................ 355/5
4,212,532 7/1980 Suzuki .................................. 355/60

*Primary Examiner*—R. L. Moses
*Attorney, Agent, or Firm*—Wenderoth, Lind & Ponack

[57] ABSTRACT

A combined reader-printer apparatus operable in reader and printer modes one at a time for projecting an optical image of an original onto a viewing screen and reproducing the image on a photosensitive medium comprises first and second reflectors carried by a carriage in spaced relation to each other and a pivotable reflector pivotable between lowered and raised positions. These reflectors are so arranged that, when the apparatus is in the reader mode, the pivotable reflector is in the lowered position to reflect the image, which has been reflected by the first reflector, towards the screen, but when the apparatus is in the printer mode, the pivotable reflector is in the raised position to allow the image reflected by the first reflector to be guided towards the photosensitive medium by way of the second reflector. The carriage has a damper for absorbing any possible shock which would be generated upon contact with each of stoppers defining respective operative positions for the carriage.

5 Claims, 6 Drawing Figures

COMBINED READER-PRINTER

BACKGROUND OF THE INVENTION

The present invention generally relates to an apparatus having two capabilities, operable one at a time, for projecting an image on a viewing screen and reproducing the image on a recording medium and, more particularly, to a combined reader-printer apparatus of a type comprising a combination of projector and printer.

A combined reader-printer apparatus of the type referred to above is well known and is currently largely utilized in, for example, libraries, laboratories or any other establishments where storage and/or tracing a vast accumulation of information are frequently carried out. According to the prior art, in order to manufacture the apparatus in a compact and sophisticated size, some of elements forming a projector optical system are concurrently utilized as element for a printer optical system, and vice versa. An example of this is disclosed in the U.S. Pat. No. 4,212,532, issued July 15, 1980. However, a difficulty has been involved not only in a rational concurrent utilization of some elements of both of the optical systems, but also in making each of the optical systems compact, for the purpose of minimizing the apparatus as a whole with an available space utilized efficiently.

Moreover, where the printer used in the apparatus is constituted by an electrophotographic copying machine of scanning exposure type wherein consecutive portions of an image to be reproduced on a copying paper are projected onto a photoreceptor surface while the latter is moved relative to the incoming light carrying such consecutive portions of the image, an attempt to make the apparatus compact in size requires the employment of a compact and efficient means for absorbing or damping shocks which would be generated when some movable part supporting some elements of the printer optical system being moved are brought to a halt.

The previously mentioned U.S. patent discloses a combined reader-printer apparatus wherein the printer optical system in constituted by first and second movable reflector and a fixed reflector for guiding rays of light carrying an optical image to be reproduced on a copying paper from an original holder towards the photoreceptor drum. Of these reflectors, the first movable reflector concurrently forms a part of the reader optical system. In this construction, when and so long as the apparatus is set to operate as a printer, i.e., in a printer mode, the first and second movable reflectors are moved in respective directions perpendicular to each other in synchronism with the rotation of the photoreceptor drum.

In this prior art apparatus, since the movable reflectors move in the different directions, not only are separate guides one for each of the first and second movable reflector required, but also the first and second movable reflectors are susceptible to fail in synchronization. Specifically, the use of the separate guides renders a drive system as a whole for moving the first and second movable reflectors to be complicated and bulky in structure.

SUMMARY OF THE INVENTION

Accordingly, the present invention has been developed with a view to substantially eliminating the above described disadvantages and inconveniences and has for its essential object to provide an improved combined reader-printer apparatus wherein the entire optical system is rationalized in such a way as to enable a part of the reader optical system to be concurrently utilized as a part of the printer optical system, with a minimized space for installation of these optical systems, thereby enabling the apparatus to be manufactured in a compact size.

According to the present invention, the above described object can be accomplished by making the first and second movable reflectors disclosed in the previously mentioned U.S. patent to move in the same direction and in a direction parallel to the direction in which the first and second movable reflectors faces towards each other. For this purpose, the present invention utilizes a unique, but simple guide structure for supporting the first and second reflectors and also for moving the first and second reflectors at the same time with no substantially complicated drive system required. A damper is also provided for minimizing the shock or impact discussed in connection with the prior art apparatus.

BRIEF DESCRIPTION OF THE DRAWINGS

These and other objects and features of the present invention will become better understood from the following description taken in conjunction with a preferred embodiment thereof with reference to the accompanying drawings, in which.

DETAILED DESCRIPTION OF THE EMBODIMENT

Figure 1:
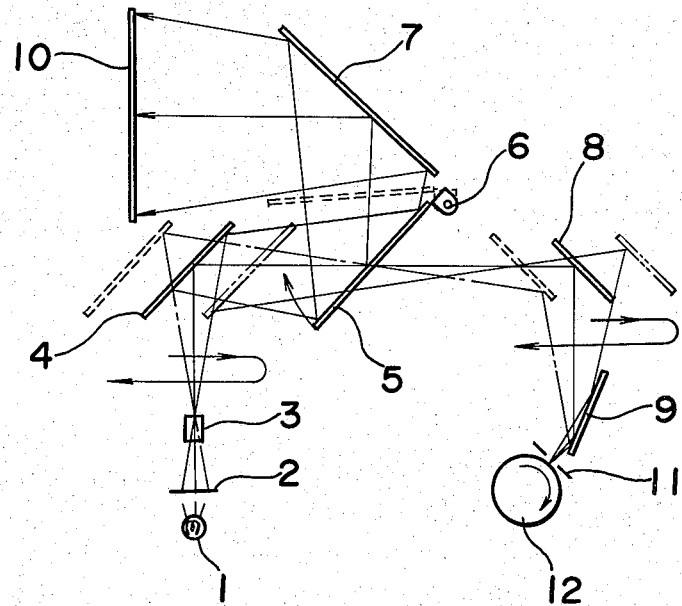
FIG. 1 is a schematic diagram showing an entire optical system of a combined reader-printer embodying the present invention.

Before the description of the present invention proceeds, it is to be noted that like parts are designated by like reference numerals throughout the accompanying drawings.

Referring first to FIG. 1, a combined reader-printer apparatus comprises a reader and a printer, a light source 1 and a projector lens assembly 3 both common to the reader and printer. The reader comprises a reader optical system, including a first reflective mirror 4, a pivotable reflective mirror 5 supported for pivotal movement between raised and lowered positions about a bearing shaft 6, and a fixed reflective mirror 7, and a viewing screen 10. So far illustrated, the reader optical system is so designed that rays of light emitted from the light source 1 and passing through the projector lens assembly 3 are first reflected by the first reflective mirror 4, positioned above the lens assembly 3, towards the pivotable reflective mirror 5 in the lowered position as shown by the solid line and, then, after having been reflected by the pivotable reflective mirror 5 fowards the fixed reflective mirror 7 positioned above the mirror 5, reflected by the fixed reflective mirror 7 towards the viewing screen 10. Therefore, an image of an original 2, for example, a microfilm or a microfiche supported on an original holder (not shown) usually positioned between the light source 1 and the lens assembly 3 can be projected onto the viewing screen 10 by means of the reader optical system which is in operation when and so long as the apparatus is in a reader mode.

The printer comprises a photoreceptor drum 12 forming a part of any known electrophotographic copying machine, and a printer optical system including, in addition to the first reflective mirror 4 which also serves as a part thereof, a second reflective mirror 8 positioned on one side of the pivotable reflective mirror 5 opposite to the first reflective mirror 4, and a fixed reflective mirror 9. The printer optical system is so designed that, when it is in operation, i.e., when and so long as the apparatus is in a printer mode with the pivotable reflective mirror 5 is in the raised position as shown by the broken line, the rays of light impinging upon the first reflective mirror 4 are reflected towards the second reflective mirror 8 which are in turn reflected fowards the photoreceptor drum 12 by way of the fixed reflective mirror 9. In practice, as will become clear from the subsequent description, the first and second reflective mirrors 4 and 8 are moved in the same direction at the same velocity in synchronized fashion relative to the rotation of the photoreceptor drum 12.

So far illustrated, the first and second reflective mirrors 4 and 8 are tilted at an angle of 45° relative to the optical axis of the lens assembly 3 with their reflective surfaces facing fowards each other and are mounted on a guide structure so designed as to enable the mirrors 4 and 8 to be moved between start and scanned positions shown respectively by the chain and broken lines in a manner as will be described later. It is to be noted that the pivotable reflective mirror 5 when in the raised position is held clear from an optical path between the first and second reflective mirrors 4 and 8, but when in the lowered position, intercept the optical path to allow the rays of light reflected from the mirror 4 and travelling towards the mirror 8 to be deflected thereby fowards the fixed reflective mirror 7.

In the construction so far described, the movable elements 4, 5 and 8, when the apparatus is set to operate in the reader mode, assume their respective positions shown by the solid lines in FIG. 1 and, therefore, the image of the original 2 can be projected on the viewing screen 10 after having been reflected by the mirror 4, then the mirror 5 in the lowered position and finally the fixed reflective mirror 7.

However, when the apparatus is set to operate in the printer mode, not only is the pivotable reflective mirror 5 pivoted to the raised position, but also the mirrors 4 and 8 are moved from the solid line positions to the chain line positions preparatory to the initiation of reproduction of the image on a copying paper and are subsequently moved from the chain line positions towards the broken line positions in synchronized fashion to the rotation of the photoreceptor drum 12. In particular, during the operation of the apparatus in the printer mode, the image of the original 2 is, after having been reflected by the mirror 4, then the mirror 8 and finally by the fixed reflective mirror 9, projected onto the photoreceptor drum 12 through a slitted plate 11 positioned in the vicinity of the photoreceptor drum 12. By this arrangement, the image of the original 2 is consecutively projected onto the drum 12 as the latter rotates in one direction shown by the arrow.

As hereinbefore described, the photoreceptor drum 12 forms a part of the known electrophotographic copying machine. Therefore, while the details of the copying machine will not be described nor shown herein since they do not constitute a subject matter of the present invention, it is to be understood that all necessary units of the copying machine such as an electrostatic charger, a developing unit, a transfer charger, a separator pawl and an eraser are arranged adjacent to and externally of the photoreceptor drum 12.

Hereinafter the guide structure for the first and second reflective mirrors 4 and 8 will be described with particular reference to FIGS. 2 and 3.

Figure 2:
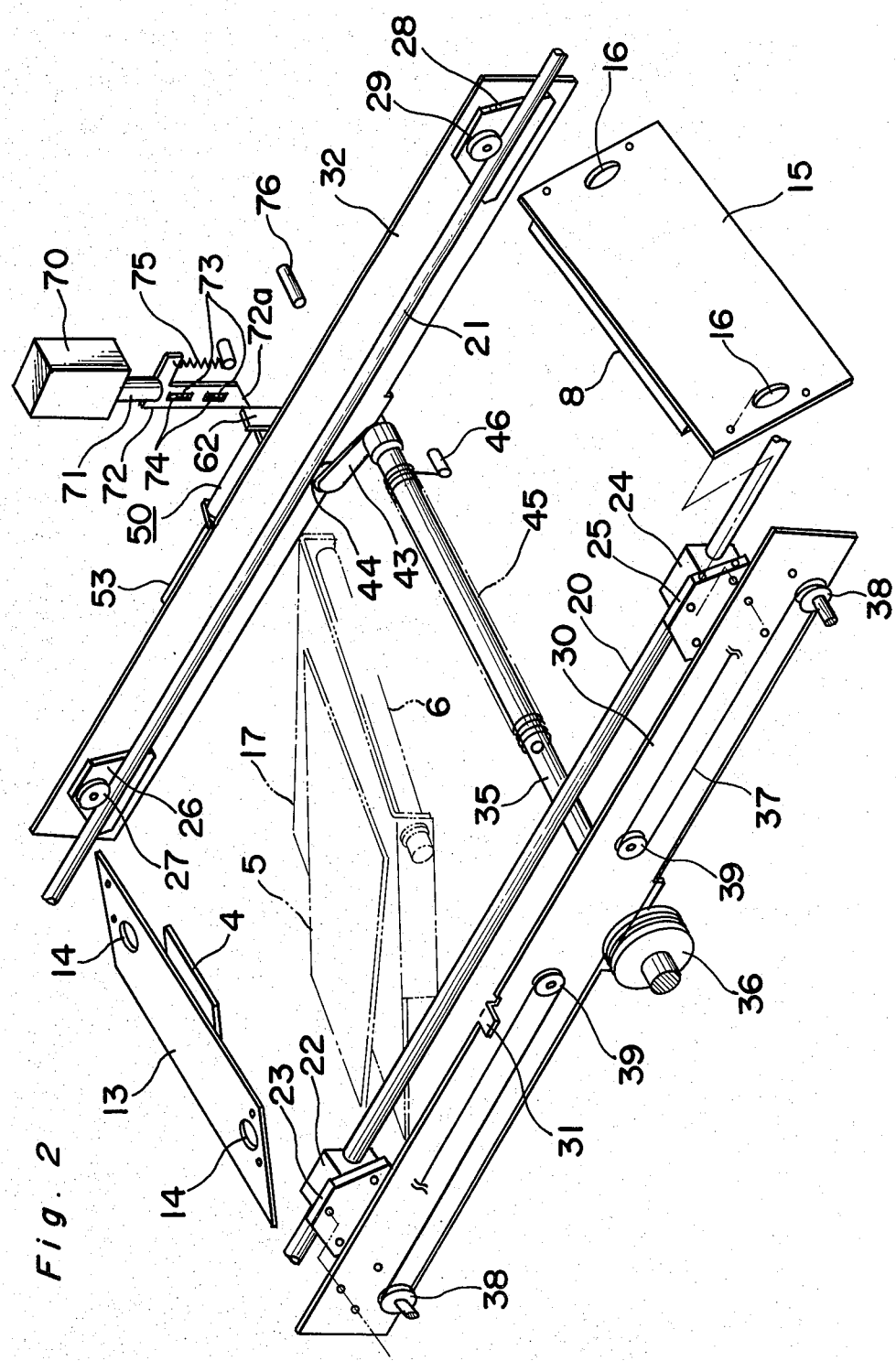
FIG. 2 is a partially exploded view showing a guide structure for a printer optical system of the apparatus.

The guide structure best shown in FIG. 2 comprises a pair of spaced guide rods 20 and 21 extending in a direction transversely of the optical axis of the lens assembly 3 and supporting a carriage thereon for movement between start and scanned positions. The carriage comprises a pair of endwisely spaced support plates 13 and 15 for the respective support of the first and second reflective mirrors 4 and 8, and a pair of spaced side plates 30 and 32 extending in parallel relation to and externally of the respective guide rods 20 and 21, the side plate 30 being movably mounted on the guide rod 20 by means of a pair of endwisely spaced bearings 22 and 24 secured thereto through corresponding brackets 23 and 25 whereas the side plate 32 in movably mounted on the guide rod 21 by means of a pair of endwisely spaced rollers 27 and 29 rotatably supported thereby through corresponding brackets 26 and 28. The support plate 13 carrying the mirror 4 is rigidly secured at its opposite ends to the brackets 23 and 26 with the guide rods 20 and 21 loosely extending through respective openings 14 in the support plate 13. Similarly, the support plate 15 carrying the mirror 8 is rigidly secured at its opposite ends to the brackets 25 and 28 with the guide rods 20 and 21 loosely extending through respective openings 16 in the support plate 15.

Figure 3:
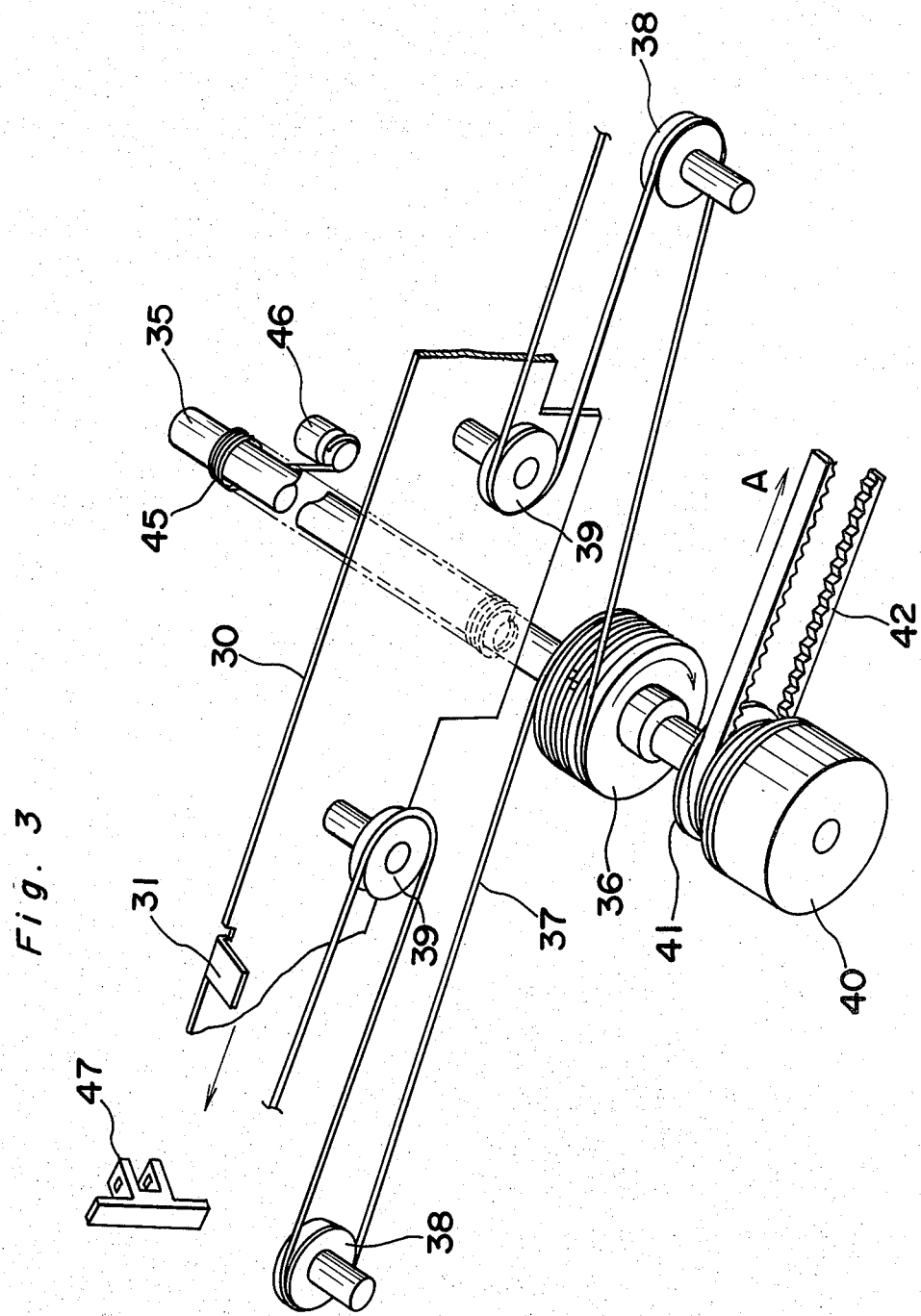
FIG. 3 is a perspective view, on an enlarged scale, showing a drive connection associated with the guide structure shown in FIG. 2.

A drive shaft 35 extends underneath the carriage in a direction perpendicular to any one of the guide rods 20 and 21 and has a drive pulley 36 and an electromagnetic clutch 40 both rigidly mounted on one end thereof as best shown in FIG. 3. A rotary motion of the drive shaft 35 which is effected in a manner as will be described later can be transmitted to the carriage by means of a traction cable 37 turned in a multiple turn around the drive pulley 36 with its opposite ends rigidly secured to opposite portions of a framework (not shown), a portion of the cable 37 between the drive pulley 36 and each of the opposite portions of the framework being turned around a corresponding idle pulley 38 and also a corresponding idle pulley 39, said idle pulleys 39 being rotatably carried by the side plate 30 while the idle pulleys 38 are rotatably carried by the framework. It is to be noted that the traction cable 37 so suspended is always held taut and, for this purpose, any known tensioning device may be employed if desired.

The electromagnetic clutch 40 includes a coupling pulley 41 operatively coupled to a drive mechanism (not shown) by means of an endless timing belt 42, said coupling pulley 41 being connectable to and disconnectable from the drive shaft 35 when the clutch 40 is engaged and released, respectively, by energization and deenergization.

An arm 43 having a roller 44 rotatably supported thereby is mounted on a support shaft rigidly secured to the side plate 32 and is normally biased clockwise, as viewed in FIG. 2, by a suitable biasing element with the roller 44 consequently forcibly contacting the guide rod 21 from below, thereby avoiding any possible undesired floating of the carriage with one or both of the rollers 27 and 29 separating from their contact with the guide rod 21. Therefore, during the movement of the carriage between the start and scanned positions, the first and second reflective mirrors 4 and 8 can be held in definite positions relative to the original 2 and the fixed reflective mirror 9.

The drive shaft 35 has a torsion spring 45 mounted on a substantially intermediate portion thereof, said torsion spring 45 having its opposite ends rigidly connected to the drive shaft 35 and a stopper pin 46 fast with the framework, so that the drive shaft 35 is normally biased counterclockwise, as viewed in FIGS. 2, and 3 about its own longitudinal axis.

In the construction so far described, when and so long as the apparatus is set to operate in the printer mode, the electromagnetic clutch 40 is electrically energized to cause the coupling pulley 41 to be coupled to the drive shaft, in response to activation of a photoelectric switch (not shown) which takes place when the photoelectric switch detects the arrival of a copying paper at a predetermined position in the vicinity of the photoreceptor drum 12. When and after the coupling pulley 41 has been so coupled to the drive shaft 35, a drive of the timing belt 42 running in a direction shown by the arrow A in FIG. 3 is transmitted to the drive shaft 35 through the coupling pulley 41 to drive both the drive shaft 35 and the drive pulley 36 in a direction clockwise as viewed in FIGS. 2 and 3, i.e., in a direction shown by the arrow in FIG. 3. As the drive pulley 36 is so rotated, a left-hand portion of the traction cable 37 is wound up around the drive pulley 36 while a right-hand portion of the same traction cable 37 is wound off from the drive pulley 36, whereby the carriage with the first and second reflective mirrors 4 and 8 thereon is moved leftwards along the guide rods 20 and 21 at a velocity which is half the peripheral velocity of the drive pulley 36 being then rotated together with the drive shaft 35. As the carriage is moved leftwards in the manner described above, the torsion spring 45 is forcibly twisted to accumulate a return biasing force necessary to move the carriage rightwards, the rightward movement of the carriage by the action of the torsion spring 45 taking place in a manner as will be described later. In this way, the carriage is moved to the scanned position with the first and second reflective mirrors 4 and 8 assuming the broken line positions shown in FIG. 1.

Upon arrival of the carriage at the scanned position, a photoelectric switch 47 shown in FIG. 3 detects the presence of an interceptor piece 31 integrally formed with and protruding laterally outwardly from the side plate 30, whereby the photoelectric switch 47 is activated. In response to the activation of the photoelectric switch 47, the electromagnetic clutch 40 is deenergized to disconnect the coupling pulley 41 from the drive shaft 35. After this has taken place, the drive shaft 35 is rotated counterclockwise under the influence of the accumulated return biasing force of the torsion spring 45 to move the carriage rightwards.

It is to be noted that, when and so long as the apparatus is set to operate in the reader mode, the carriage is held in a normal position intermediate between the start and scanned positions with the first and second reflective mirrors 4 and 8 assuming the solid line positions shown in FIG. 1. It is also to be noted that, while the carriage is held in the normal position when and so long as the apparatus is set to operate in the reader mode, switching over from the reader mode to the printer mode results in a preparatory movement of the carriage from the normal position to the start position where the first and second reflective mirrors 4 and 8 assume the chain line positions shown in FIG. 1. Mechanisms necessary to achieve these functions will now be described together with a damper means for absorbing shocks which would occur when the carriage after having arrived at the scanned position returns to the normal position.

Figure 4:
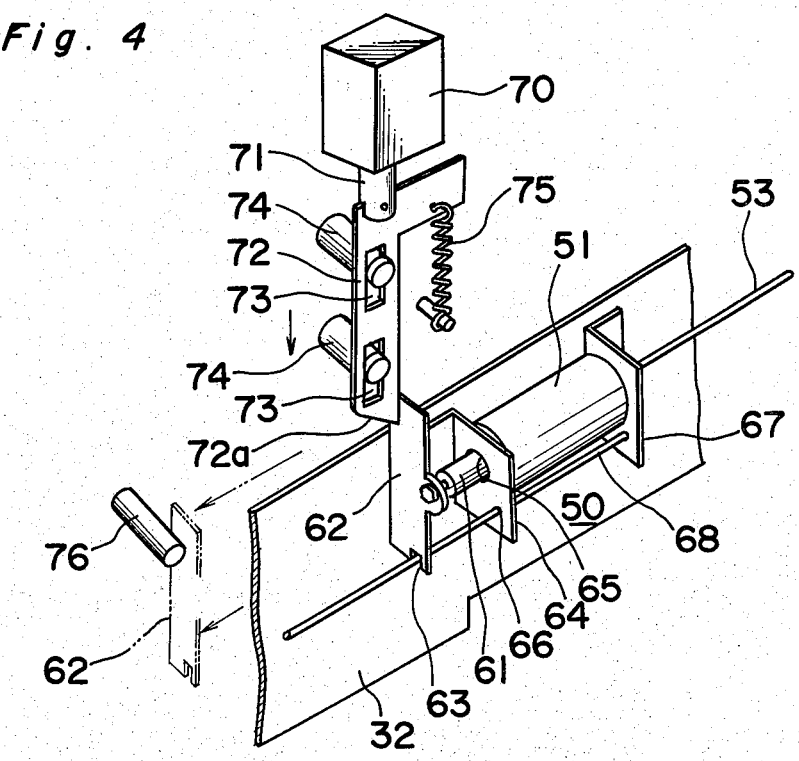
FIG. 4 is a perspective view, showing a damper and its associated parts used in the guide structure.
Figure 5:
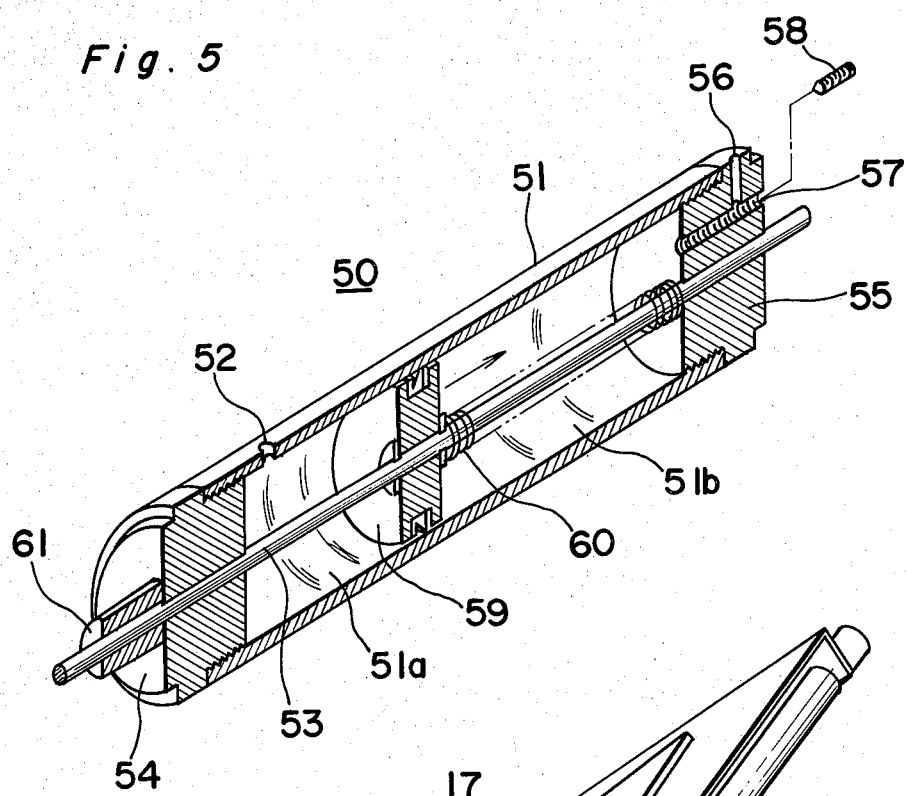
FIG. 5 is a perspective view, on an enlarged scale, of the damper shown in longitudinal sectional view.

Referring now to FIGS. 2, 4 and 5, a damper, generally identified by 50 and carried by the side plate 32 for movement together with the carriage, comprises a hollow cylinder 51 having its opposite ends closed by plugs 54 and 55, and a piston member 59 axially movably housed within the cylinder 51 and dividing the interior of the cylinder 51 into a pair of chambers 51a and 51b one on each side of the piston member 59. The chamber 51a is communicated to the atmosphere through a vent defined at 52 in the cylinder while the chamber 51b is communicated to the atmosphere through an adjustable orifice means. The adjustable orifice means is constituted by a threaded passage 57 axially defined in the plug 55 and receiving an adjustment screw 58 threaded exteriorly into the threaded passage 57, and a vent passage 56 defined also in the plug 55 and having its opposite ends communicated to the atmosphere and the threaded passage 57. It will readily be seen that, by turning the adjustment screw 58 in either direction, the degree of communication between the atmosphere and the chamber 51b, which means a pneumatic velocity of air flowing from the atmosphere into the chamber 51b, and vice versa, can be adjusted.

Coaxially extending through the cylinder 51 and also through the piston member 59 is a damper rod 53 movable axially together with the piston member 59. This damper rod 53 and, hence, the piston member 59, is normally biased leftwards, as viewed in FIG. 5, by the action of a biasing spring 60 mounted on the damper rod 53 within the chamber 51b and interposed between the piston member 59 and the plug 55. A stopper plate 62 is rigidly mounted on one free end of the damper rod 53 while openings 65 and 66 both defined in a plate member 64 receives loosely therethrough a positioning collar 61 fast with the plug 54 and a guide rod 68 rigidly connected to a bracket 67. A recess 63 defined in the stopper plate 62 receives the guide rod 68 for axial movement relative thereto.

What serves to stop the movement of the carriage at the normal position while imparting a damping effect to the carriage is a counter-stopper lever 72 coupled at one end to a plunger 71 of a solenoid unit 70. This lever 72 is supported for movement in a direction perpendicular to the longitudinal axis of the cylinder 51 by means of a pair of spaced support pins 74 loosely engaged in respective slots 73 defined in said lever 72, and is normally biased downwards by the action of a biasing spring 75. With the lever 72 so biased downwards by the biasing spring 75, the free end of the lever 72 remote from the plunger 71 is engaged to the stopper plate 62 to hold the carriage in the normal position. However, when the free end of the lever 72 disengage from the stopper plate 62 in a manner as will be described later, the carriage can move from the normal position towards the start position, in a manner as will be described later, where the stopper plate 62 abuts against a stopper pin 76 fast with the framework.

In the construction described above, as the carriage being moved from the scanned position by the action of the torsion spring 45 in the manner as hereinbefore described approaches the normal position, the stopper plate 62 contacts the free end of the lever 72 then downwardly biased by the spring 75 because of deenergization of the solenoid unit 70. Upon contact of the stopper plate 62 to the lever 72, the stopper plate 62 is displaced in a direction close towards the cylinder 51 against the spring 60 with the piston member 59 axially displaced correspondingly while air contained inside the chamber 51b is expelled to the outside of the cylinder 51 through the threaded passage 57 and then through the vent passage 56 at a controlled pneumatic velocity. During the displacement of the piston member 59 against the spring 60, the carriage continues to move fowards the normal position at a controlled speed which is lower than the speed of movement of the carriage prior to contact of the stopper plate 62 to the lever 72. Thus, any possible shock or impact is absorbed by the damper 50, thereby enabling the carriage to arrive at the normal position in the controlled manner.

On the other hand, the solenoid unit 70 is electrically instantaneously energized in response to the arrival of the pivotable reflective mirror 5 from the lowered position to the raised position, thereby causing the free end of the lever 72 to disengage from the stopper plate 62 to allow the carriage to move from the normal position towards the start position. This movement of the carriage from the normal position towards the start position is effected by the action of the torsion spring 45 because the return biasing force accumulated in the torsion spring 45 has not yet completely been exhausted at the time of the arrival of the carriage at the normal position from the scanned position. In other words, the return biasing force accumulated in the torsion spring 45 is used in part to move the carriage from the scanned position to the normal position and in part to move the same carriage from the normal position to the start position.

Figure 6:
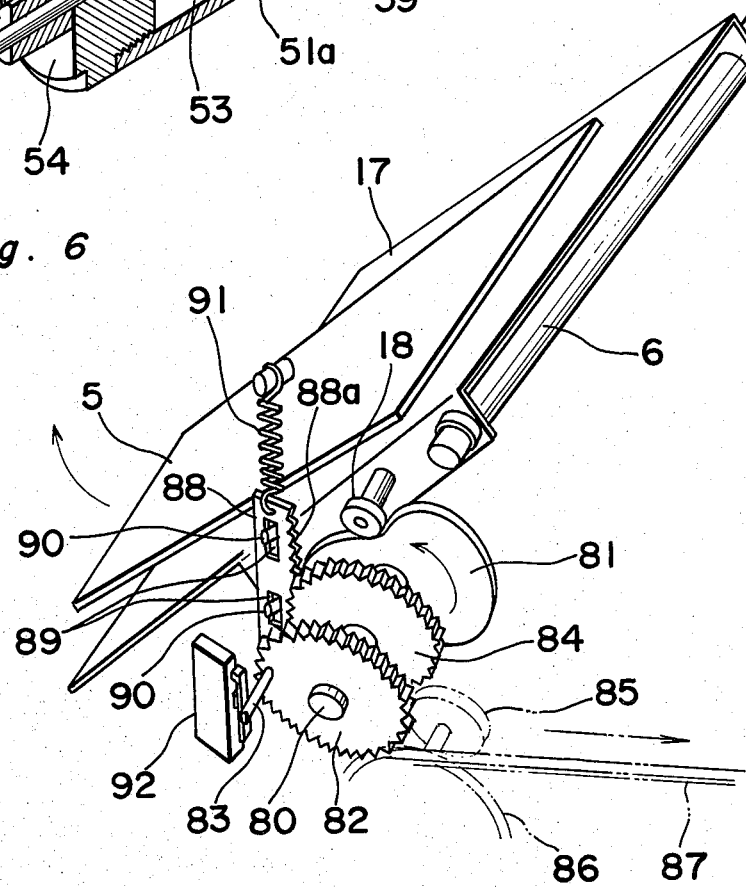
FIG. 6 is a perspective view, on a somewhat enlarged scale, showing a pivotable reflector and its drive connection.

Referring to FIG. 6, there is shown a drive mechanism for pivoting the pivotable reflective mirror 5 between the raised and lowered positions about the bearing shaft 6. The reflective mirror 5 is rigidly mounted on a pivotable plate 17 supported pivotally at one end by the bearing shaft 6 and having a roller 18 carried thereby and protruding laterally outwards therefrom. While the pivotable plate 17 is lowered about the shaft 6 under the influence of a gravitational force with the mirror 5 held in the lowered position, the roller 18 rests on a cam wheel 81 which is so shaped as will be described later.

The cam wheel 81 is rigidly mounted on a shaft 80 together with gear wheels 82 and 84, the gear wheel 82 being constantly meshed with a drive gear 85 which is operatively coupled to a drive unit by means of a driven pulley 86 through an endless timing belt 87. The gear wheel 84 is in the form of a ratchet wheel and is engaged with a toothed edge 88a formed in a reverse prevention lever 88 for avoiding any possible reverse rotation of the geared wheel 84. The lever 88 is supported for movement up and down by means of a pair of spaced pins 90 loosely engaged in respective slots 89 in the lever 88 and is normally biased upwards, as viewed in FIG. 6, by a return spring 91. This lever 88 serves to permit the geared wheel 84 to rotate counterclockwise, as viewed in FIG. 6, about the shaft 80, but to prevent the geared wheel 84 to rotate clockwise. It is to be noted that, while the lever 88 permits the geared wheel 84 to rotate counterclockwise, teeth of the geared wheel 84 can slip over teeth of the toothed edge 88a.

Although not shown, one-way clutch is provided between the drive gear 85 and the pulley 86, which clutch is normally held in an OFF state so that the rotation of the pulley 86 can not be transmitted to the geared wheel 84. Under this condition, the roller 18 fast with the pivotable plate 17 is engaged to a reduced diameter portion of the cam wheel 81 with the mirror 5 consequently held in the lowered position as shown by the solid line in FIG. 1.

However, when the one-way clutch is brought into an ON state in response to activation of a "PRINT" switch (not shown), the rotation of the pulley 86 is transmitted through the drive gear 85 to the geared wheel 84 to rotate the latter counterclockwise together with the cam wheel 81 and the geared wheel 82. As the cam wheel 81 rotates about the shaft 80, the roller 18 fast with the pivotable plate 17 relatively rides on a large diameter portion of the cam wheel, pivotting the plate 17 clockwise about the shaft 6 to bring the mirror 5 from the lowered position to the raised position as shown by the broken line in FIG. 1. It is to be noted that the time during which an electric current is supplied to the one-way clutch is so controlled by a suitable timer circuit as to interrupt the supply of the electric current upon arrival of the mirror 5 at the raised position.

Upon arrival of the mirror 5 at the raised position, a detector switch (not shown) is activated to energize the solenoid unit 70 instantaneously to initiate the movement of the carriage from the normal position to the start position in the manner as hereinbefore described.

The movement of the carriage from the start position fowards the scanned position is initiated when the electromagnetic clutch 40 is energized in response to an electrical signal indicative of the arrival of the copying paper at the predetermined position. As the carriage moves fowards the scanned position, the stopper plate 62 passes beneath the counter-stopper lever 72 while causing the latter to shift upwards against the spring 75 in contact with a slope defined at 72a in the free end of said lever 72.

Upon arrival of the carriage at the scanned position, the photoelectric switch 47 detects the presence of the intercepter piece 31, thereby deenergizing the clutch 40 to disconnect the pulley 41 from the shaft 35 while the latter is permitted to rotate by the action of the torsion spring 45. By so doing, the carriage once moved to the scanned position is moved towards the normal position. In the other hand, the one-way clutch is again brought into an ON state in response to a detection signal from the photoelectric switch 47 to initiate the counterclockwise rotation of the cam wheel 81 and the geared wheels 82 and 84 with the roller 18 consequently riding on the reduced diameter portion of the cam wheel 81, thereby allowing the mirror 5 to assume the lowered position. Upon arrival of the mirror 5 at the lowered position, a microswitch 92 is activated by a pin 83 fast with the geared wheel 82 to deenergize the one-way clutch.

The above described cycle of operation of the apparatus is repeated each time the "PRINT" switch is turned on. In other words, each cycle of operation includes the sequence of pivotal movement of the mirror 5 from the lowered position to the raised position, movement of the carriage from the normal position to the start position and then from the start position to the scanned position and back to the normal position and pivotal movement of the mirror 5 back to the lowered position, all being performed subsequent to the switching-on of the "PRINT" switch.

However, the apparatus may have a capability of reproducing one and the same image on a plurality of copying papers and, for this purpose, arrangement may be made to retain the mirror 5 at the raised position by the action of the one-way clutch based on a switching signal generated from a counter dial (not shown) and, on the other hand, to keep the solenoid unit 70 in the energized condition until a desired number of copies are reproduced.

As hereinbefore described, the engagement of the toothed edge 88a of the lever 88 with the geared wheel 84 prevents the geared wheel 84, and hence, the cam wheel 81, from being rotated clockwise about the shaft 80. This is advantageous in that prevention is made to avoid any possible collision of the pivotable reflective mirror 5 with the first reflective mirror 4 which would take place when the supply of an electrical power to all electrically operated elements including the one-way clutch and the clutch 40 fails by reason of, for example, interruption of the commercial power supply or malfunctioning of the electric circuits.

Although the present invention has fully been described in connection with the preferred embodiment thereof with reference to the accompanying drawings, it is to be noted that numerous changes and modifications are apparent to those skilled in the art. By way of example, an additional damper similar in construction to the damper 50 may be employed for absorbing any possible shock or impact which would be generated when the carriage being moved from the start position arrives at the scanned position.

Such changes and modifications are to be understood as included with in the scope of the present invention unless they depart therefrom.

What is claimed is:

1. A combined reader-printer apparatus operable in two different, reader and printer modes one at a time for projecting an optical image of an original onto a viewing screen and reproducing the optical image of the original on a photosensitive medium, which comprises, in combination:

an image forming means for forming the optical image of the original irrespective of the mode in which the apparatus is set to operate;
first and second reflectors;
a carriage carrying the first and second reflectors in spaced relation to each other, said first and second reflectors being so arranged and so supported thereby that, when the apparatus is set to operate in the printer mode, the optical image can be guided from the image forming means onto the photosensitive medium after having been reflected by the first reflector and then by the second reflector;
a guide means for supporting the carriage for scanning movement between start and scanned positions in a direction parallel to an imaginary line drawn between the first and second reflectors;
means for holding the carriage at a normal position when and so long as the apparatus is set to operate in the reader mode;
a pivotable reflector supported for pivotal movement between first and second positions, said pivotable reflector when in the first position intercepting an optical path between the first and second reflectors for guiding the optical image, which has been reflected by the first reflector, towards the viewing screen, said pivotable reflector when in the second position being clear from the optical path between the first and second reflectors and also from the path of movement of the carriage, said pivotable reflector being set in the first and second positions respectively when the apparatus is in the reader and printer modes; and
means operable when the apparatus is in the printer mode for driving the carriage reciprocately between the start and scanned positions.

2. An apparatus as claimed in claim 1, wherein said normal position is located intermediately between the start and scanned positions.

3. An apparatus as claimed in claim 1, wherein said first and second reflectors are supported so as to incline at a rectangular angle relative to the imaginary line with their reflective surfaces facing each other.

4. An apparatus as claimed in claim 2, wherein said holding means comprises a damper means carried by the carriage for movement together therewith, and a movably supported stopper operable to project into the path of movement of the damper means, when the apparatus is set to operate in the reader mode, to hold the carriage at the normal position, said damper means being operable to absorb any possible shock which would be generated upon contact with the movably supported stopper.

5. An apparatus as claimed in claim 4, wherein the start position is defined by a fixed stopper said fixed stopper cooperating with said damper means when the carriage is moved from the normal position to the start position preparatory to the movement from the start position towards the scanned position.

* * * * *